Oct. 10, 1950     R. V. WHITE     2,525,743
PRESSURE CONTROLLED CIRCUIT MAKER AND BREAKER
Filed Jan. 16, 1948
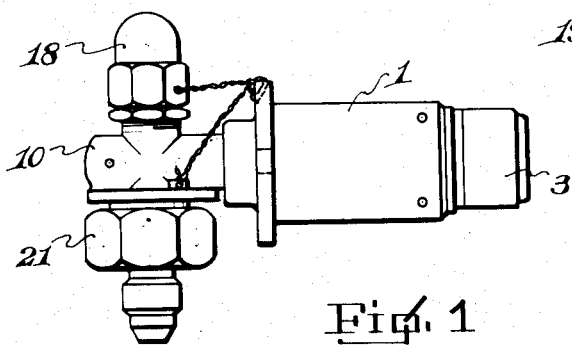
Fig. 1
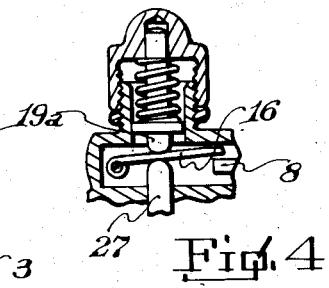
Fig. 4
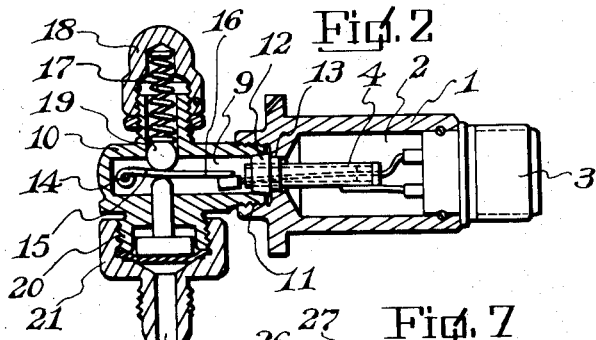
Fig. 2
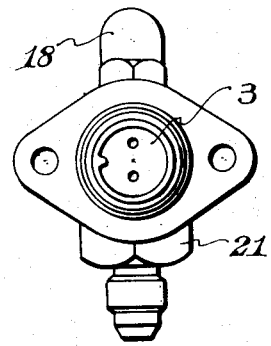
Fig. 5
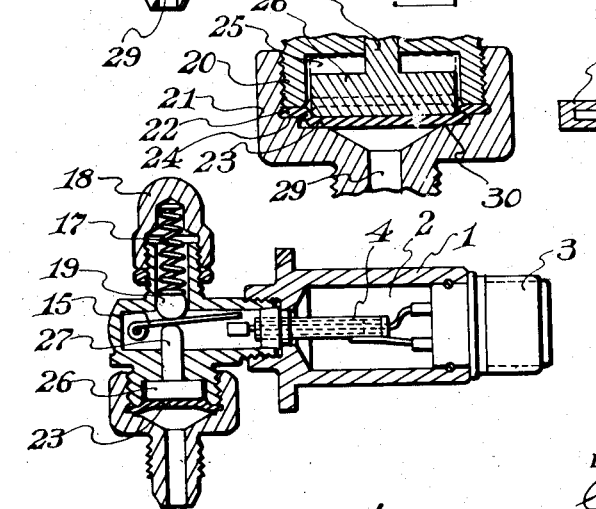
Fig. 7
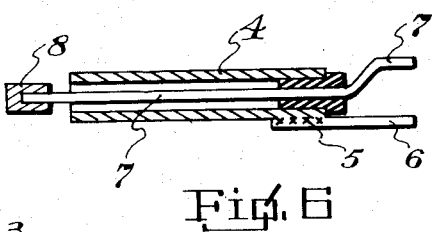
Fig. 6
Fig. 3
Inventor
Rex V. White
By Philip A. H. Terrell
Attorney Patented Oct. 10, 1950

2,525,743

UNITED STATES PATENT OFFICE 2,525,743

PRESSURE CONTROLLED CIRCUIT MAKER AND BREAKER

Rex V. White, Los Angeles, Calif.

Application January 16, 1948, Serial No. 2,716

2 Claims. (Cl. 200—83)

The invention relates to circuit makers and breakers, and has for its object to provide a device of this kind, which is diaphragm controlled, and one wherein, under normal pressures, a limited area of the diaphragm is exposed to the pressure, and upon excessive pressure an increased area of the diaphragm is suddenly exposed to the action of the pressure for insuring a quick breaking of a circuit, thereby obviating vibration and sparking.

A further object is to provide a hinged arm between a plunger actuated by the diaphragm and a spring pressed member for regulating the amount of pressure necessary on the under side of the diaphragm for opening or closing the circuit.

A further object is to provide a flexible conductor arm within a tubular conductor member and adapted to be flexed into and out of contact with the tubular conductor member by the diaphragm controlled hinged arm.

A further object is to clamp the marginal edge of the diaphragm between separable members, and to provide one of the receptacle members wtih a shoulder of lesser diameter than the diaphragm and forming a seat for the diaphragm under normal pressures, and upon seating of the diaphragm suddenly exposing additional area of the diaphragm to the pressure for a quick breaking of the circuit.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the circuit maker and breaker.

Figure 2 is a vertical longitudinal sectional view through the circuit maker and breaker, showing the parts in closed position.

Figure 3 is a view similar to Figure 2, but showing the circuit open.

Figure 4 is a vertical longitudinal sectional view through the upper portion of the device, showing a spring actuated plunger instead of a ball.

Figure 5 is a rear end view of the device.

Figure 6 is a vertical longitudinal sectional view showing the spring arm contact member and tubular contact member.

Figure 7 is an enlarged sectional view better showing the diaphragm seat.

Referring to the drawing, the numeral 1 designates a main cylindrical casing having a chamber 2 therein. Mounted in the outer end of the casing is a conventional form of electric connector 3, adapted to receive a conventional form of plug. Disposed axially within the chamber 2 is a cylindrical conductor member 4, having welded thereto, at 5, a supporting conductor arm 6, extending into the plug receptacle 3. The other contact member from the plug receptacle 3 is in form of spring arm 7, which extends axially through the conductor sleeve 4 in spaced relation to the inner periphery thereof and terminates in an insulation block 8 at its outer end, and which block is disposed in the chamber 9 of the extension casing 10.

Casing 10 is threaded at 11 into the main cylindrical casing 1 and the outer end of the conductor sleeve 4 is supported in an insulation bushing 12 in the aperture 13 of the member casing 1. The arm 7 is adapted to be flexed upwardly or downwardly for contact with the sleeve 4 for a circuit opening or closing operation by the diaphragm controlled mechanism hereinafter set forth.

The extension casing 10 has pivotally mounted, at 14, therein a swinging arm 15, the free end 16 of which cooperates with the insulation block 8 for closing or opening the circuit. Arm 15 is normally forced downwardly by an expansion spring 17 within the threaded extension 18 of the extension casing 10, and which spring acts on a ball 19, which ball engages the arm 15, however a plunger as shown at 19a, Figure 4, may be used if desired. The lower end or side of the casing 10 is provided with a downwardly extending threaded flange 20, threaded into the connector 21 and clamps the marginal edge 22 of the diaphragm 23 against the shoulder 24 within the connector 21, clearly shown in Figure 7. Slidably mounted within a chamber 25 of the threaded extension 20 is a plunger 26 having an upwardly extending shaft 27, which shaft engages the under side of the hinged arm 15. By regulating the cap 18, it will be seen that the tension of the spring 17 may be varied for limiting the upward movement of the diaphragm 23 by pressure acting on the under side thereof through the port 29 for a predetermined amount, and as long as this predetermined amount is not exceeded the circuit remains closed.

If the pressure exceeds the predetermined setting of the device, the diaphragm is flexed upwardly, and the plunger is forced upwardly thereby overcoming the expansive action of the expansion spring 17, and during this action the free end of the lever 16 moves upwardly, thereby allowing the spring contact arm 7 to assume its axial position in the conductor sleeve 4, and breaking the contact. It has been found that to prevent arcing and fluctuating at the contact point of the arm 7 with the sleeve 4, a quick unseating of the diaphragm is necessary. To accomplish this result the fitting 21 is provided with an annular seat 30 of smaller diameter than the diaphragm, thereby exposing a limited amount of the diaphragm to the action of the pressure. As soon as the diaphragm unseats from the seat 30 an additional area of the diaphragm is exposed to the pressure through port 29, consequently there is a quick upward movement of plunger 26, and therefore a quick breaking of the contacts. If desired, the adjusting cap 18 may be held and locked against unauthorized movement by a holding or locking safety wire 31.

From the above it will be seen that a diaphragm controlled circuit maker and breaker is provided which is simple in construction, the parts reduced to a minimum and one wherein there will be a quick breaking of the circuit when a predetermined pressure is obtained.

The invention having been set forth what is claimed as new and useful is:

1. A diaphragm controlled circuit maker and breaker comprising a main casing having a chamber therein, an extension casing threaded into the outer end of the main casing and having a chamber therein in axial relation to the chamber of the main casing, a contact sleeve within the chamber of the main casing and extending outwardly and terminating in the inner end of the chamber of the extension casing, the outer end of the contact sleeve being anchored and supported by the connection between the main casing and the extension casing, a flexible arm contact anchored in the inner end of the chamber of the main casing and extending axially through the tubular contact member and terminating in the chamber of the extension chamber, a hinged arm within the chamber of the extension casing and having its free end extending inwardly towards the outer end of the flexible contact and overlying the end of the flexible contact, a downwardly extending diaphragm carrying member carried by the extension casing, and having a pressure receiving port therein, a marginally clamped diaphragm in the port of the diaphragm carrying extension, a plunger resting on said diaphragm and extending through an aperture in the extension casing in the path of the hinged member within the chamber of the extension casing and adapted to force said hinged member upwardly and spring means cooperating with the upper side of the hinged member in the chamber of the extension casing, said spring means being adapted to be overcome by pressure on the under side of the diaphragm for raising the hinged member and allowing the spring contact arm to move upwardly out of contact with the inner periphery of the tubular contact member.

2. A device as set forth in claim 1 including a valve seat below the diaphragm, said valve seat defining a reduced area of the under side of the diaphragm exposed to pressure when the circuit is closed and forming means whereby a rapidly increased area of the diaphragm is exposed to pressure upon excess pressure, thereby insuring a quick breaking of the circuit through the contact members.

REX V. WHITE.

REFERENCES CITED

The following references are of record in the file of this patent:

UNITED STATES PATENTS

| Number | Name | Date |
|--------|------|------|
| 1,744,940 | White | Jan. 28, 1930 |
| 1,827,102 | Penn | Oct. 13, 1931 |
| 1,841,326 | Eggleston | Jan. 12, 1932 |
| 2,302,283 | Yarnall | Nov. 17, 1942 |